(No Model.) 2 Sheets—Sheet 1.
O. FRIESE.
PHOTOGRAPHIC SHUTTER.

No. 562,599. Patented June 23, 1896.

WITNESSES.
C. Sedgwick
J. S. Barringer

INVENTOR:
O. Friese
BY
Munn & Co
ATTORNEYS.

(No Model.) 2 Sheets—Sheet 2.
O. FRIESE.
PHOTOGRAPHIC SHUTTER.
No. 562,599. Patented June 23, 1896.
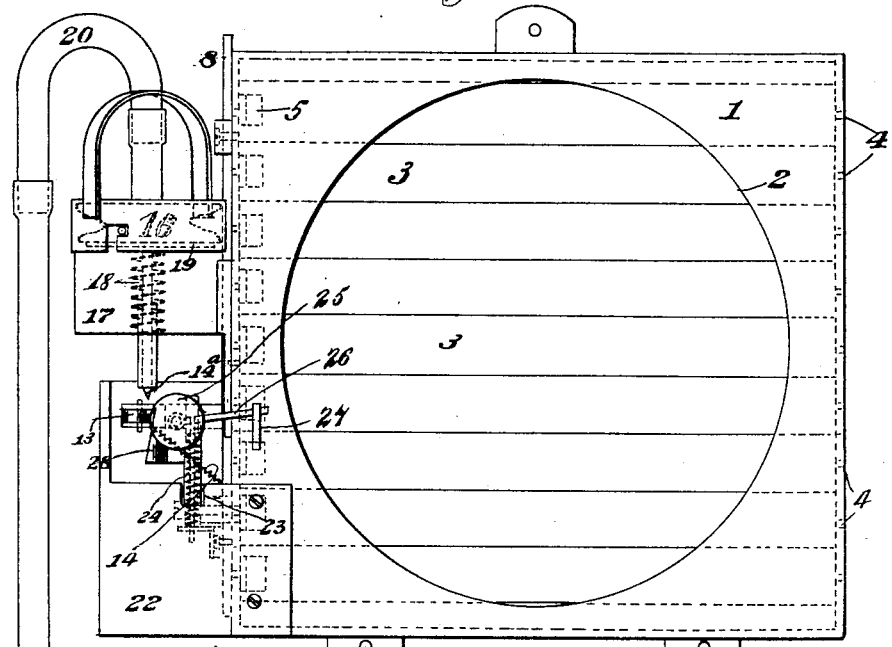
*Fig. 3.*
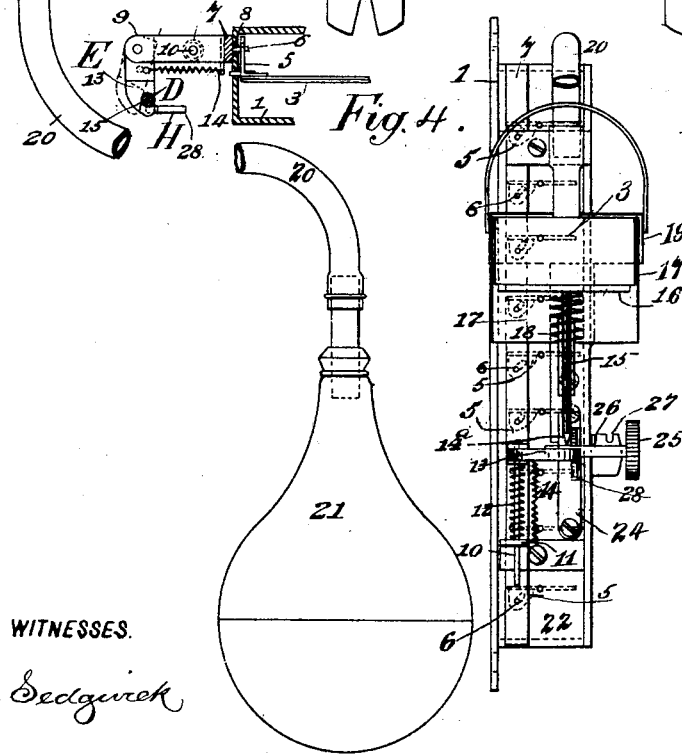
*Fig. 4.* *Fig. 5.*
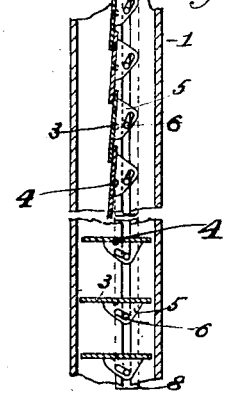
*Fig. 6.*
*Fig. 7.*
WITNESSES.
C. Sedgwick
J. D. Barlinger
INVENTOR:
O. Friese
BY
Munn & Co.
ATTORNEYS

UNITED STATES PATENT OFFICE.

OSKAR FRIESE, OF BERLIN, GERMANY, ASSIGNOR TO SCHIPPANG & WEHENKEL, OF SAME PLACE.

PHOTOGRAPHIC SHUTTER.

SPECIFICATION forming part of Letters Patent No. 562,599, dated June 23, 1896.

Application filed July 29, 1895. Serial No. 557,488. (No model.)

*To all whom it may concern:*

Be it known that I, OSKAR FRIESE, a subject of the King of Prussia, Emperor of Germany, residing at Berlin, in the Kingdom of Prussia, Germany, have invented new and useful Improvements in or Relating to Photographic Time or Instantaneous Shutters, of which the following is a specification.

This invention relates to certain improvements in photographic shutters, adapted to be employed for regulating the exposure of the sensitized film in cameras, and the object of the invention is to provide a device of this character of a simple and inexpensive construction, which shall be adapted to be conveniently manipulated, so as to produce either an instantaneous or time exposure, the construction being such that the shutter may be made of any desired size, so as to give the best results with any lens.

The invention consists in a shutter having a series of pivoted parallel strips arranged side by side, and adapted when moved to position at right angles to the sensitized surface to permit free passage of the reflected light between them, but when moved in the reverse direction to fold flat against one another, so as to exclude the light from the lens to which the shutter is applied, and means for actuating said strips simultaneously to open and close the shutter.

The invention also contemplates certain novel features of the construction, combination, and arrangement of the various parts of the device, whereby certain important advantages are attained and the device is made better adapted for use than other photographic shutters heretofore devised, all as will be hereinafter fully set forth.

The novel features of the invention will be carefully defined in the claims.

Reference is to be had to the accompanying drawings, forming a part of this specification, in which similar characters of reference indicate corresponding parts in all the figures.

Figure 1:
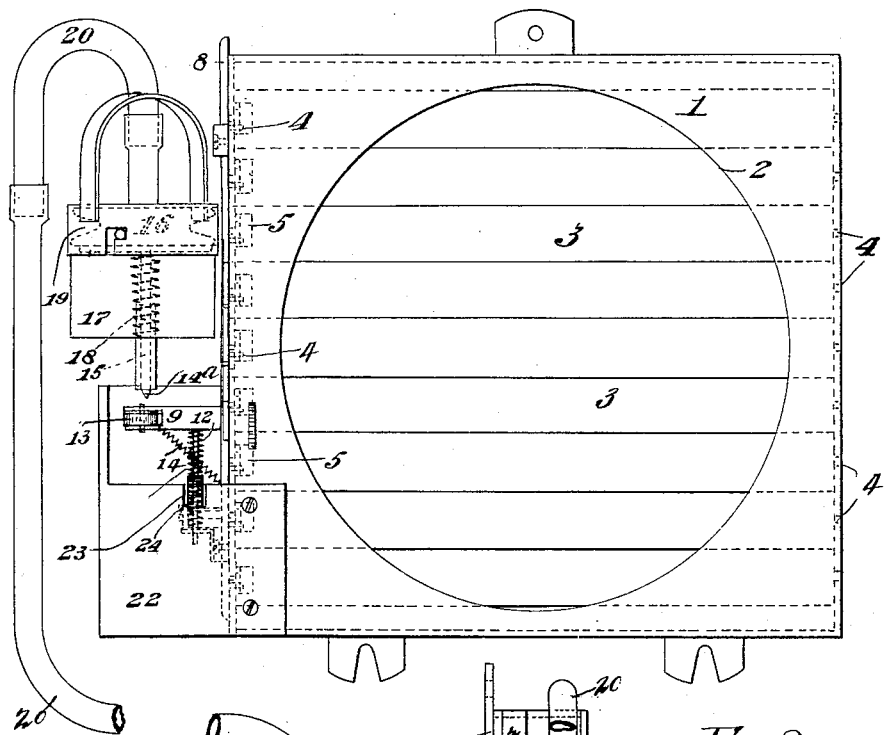
Figure 2:
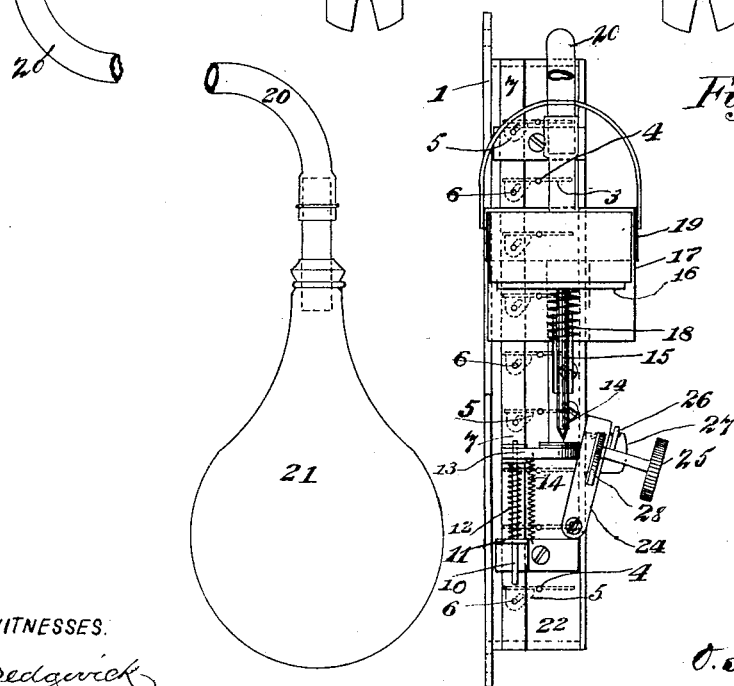

Figure 1 is a face view of a shutter constructed in accordance with my invention, the trip device for securing instantaneous exposure being omitted. Fig. 2 is an edge view of the same, showing said trip device swinging out of operative position. Fig. 3 is a view similar to Fig. 1, but showing the device adapted for instantaneous exposure. Fig. 4 is a fragmentary plan view of the arm on the shutter-rail and its connected devices. Fig. 5 is an edge view showing the device constructed as seen in Fig. 3. Fig. 6 is a sectional view showing a fragment of the shutter and the strips therein in their closed position, and Fig. 7 is a similar view wherein said strips are shown in their open position.

In the drawings, 1 represents the casing of the device, which may be of any usual form, having a central opening 2, usually of circular form, in its front wall for the passage of the light to the lens. A series of narrow strips 3 are arranged transversely across the casing 1, inside thereof, and said strips may be of any opaque material, being pivoted at their ends, as indicated at 4 in the drawings, to the end walls of the casing in such a way that when moved on their pivots they are adapted to overlap each other at their edges, as clearly shown in Fig. 6, which is a sectional view showing said strips in their closed position.

Each of the strips 3 is provided at its left-hand end, as seen in Fig. 1, with a depending bracket 5, having an inclined slot, and said slots are arranged to be engaged by pins 6, projecting from the inner side of a vertically-moving slide 7, guided on the end wall of the casing over a longitudinal slot or recess 8 therein, which slot is arranged to be closed by said slide and through which said pins 6 extend, as seen in Figs. 5 and 6.

Near its lower end the slide 7 is formed with a projecting arm or bracket 9, having a guide-pin 10 depending from it and guided at its lower end in a perforated bracket 11, projecting from the casing, and said guide-pin carries a spring 12 between said bracket 11 and arm 9, adapted to hold the slide 8 normally in a raised position, the strips 3 being thereby normally held closed, as seen in Figs. 1 and 6.

At the outer end of the arm 9 is pivoted a finger 13, having a spring 14, adapted to hold it normally in the position seen in Fig. 1, and said finger 13 is adapted to be engaged on its upper side by a point 14ª, formed on the lower end of the stem 15 of a pneumatic piston 16, mounted in a cylinder 17, having a removable cap 19, a spring 18 being arranged on the said stem 15 between the under side of said piston and the bottom of the cylinder, whereby said piston is normally held raised, so that the point 14ᵃ is out of engagement with said finger 13.

The piston 16 is arranged to communicate through a flexible tube 20 with a compressible bulb 21, and in the operation of the shutter, when it is desired to open the same to expose the sensitized film, said bulb is pressed in the hand in the usual manner, so as to force the air out of the same into the pneumatic piston, whereby the piston-stem is forced down into engagement with the finger 13, thereby forcing down the slide 7 also, and tilting the strips 3 to a horizontal position, as seen in Fig. 6.

As seen in the drawings, a bracket 22 is fixed to the casing 1 below the arm 9, and said bracket is provided with a notch 23 at its front side, wherein is pivoted the lower end of a swinging trip-bar 24, having a handle 25, and provided on its side nearest the casing with a projecting latch 26 to engage a notched latch-plate 27 on the front of the casing, and the outer side of said trip-bar is provided with a downwardly and outwardly inclined wing 28, adapted to be engaged by the inner side of the pivoted finger 13 when the same is forced downward, so that said finger is caused to move outward or away from casing 1 when forced down.

In using the shutter for time-exposures, the trip-bar 24 is swung to the position seen in Fig. 2, out of engagement with the finger 13, and when in this position, if the bulb 21 be pressed, said finger will be forced down against the tension of spring 12, carrying with it the slide 7, which, being connected to the strips 3, causes said strips to swing on their pivots to their horizontal open position. (Shown in Fig. 7.) The bulb may be held compressed for any desired duration of time, and when it is released the tension of the spring 12 reacts on the arm 9 so as to raise the same, together with the slide 7, to its normal position, thereby closing the strips 3, so as to shut off the light to the lens, as will be readily understood.

When the device is to be used for instantaneous exposures, the trip-bar 24 is moved back to the position seen in Figs. 3 and 5, the latch 26 being engaged with the notched plate 27, so as to hold said trip securely with its inclined surface 28 in position to be engaged by the finger 13 when the same is pushed down by the compression of the bulb, as above described.

As the finger 13 moves down, it is gradually moved sidewise also by the inclined wing 28 on the bar 24, so that it is at last disengaged from the lower end 14ᵃ of the piston-stem 15 and is forced upward by means of the spring 12, which is compressed by its downward movement, so as to raise the slide 7 and close or fold the slats or strips 3 together, so as to shut off the light to the lens.

From the above description of my invention it will be seen that the device is quite simple and inexpensive and is well adapted for use for taking instantaneous and time exposures, since it is arranged to be conveniently adjusted for either purpose. It will also be obvious that the invention is susceptible of considerable modification without material departure from the principles and spirit of my invention, and for this reason I do not wish to be understood as limiting myself to the exact construction herein set forth.

Having thus described my invention, I claim as new and desire to secure by Letters Patent—

1. In a photographic shutter, the combination of a casing having an opening, slats to close said opening, a slide connected to said slats, a finger movably mounted on said slide, a stem having engagement with said finger, means for actuating said stem to move the slide in one direction, a spring for moving the slide in the other direction, and means for throwing said finger out of engagement with said stem when the slide is moved to open the slats, substantially as set forth.

2. In a photographic shutter, the combination of a casing having an opening, slats to close said opening, a slide connected to said slats, a finger on said slide, a stem normally engaging said finger, means for actuating the stem to move the slide in one direction, a spring for moving the slide in the other direction, and means actuated by the downward movement of said stem for releasing said finger from engagement therewith, substantially as set forth.

3. In a photographic shutter, the combination of a casing having an opening, slats to close the same, a slide connected to the slats, a finger pivoted on said slide, a stem normally engaging said finger, means for actuating said stem to move the slide in one direction, a spring to move the slide in the other direction, and a trip device arranged when moved in one direction to engage said finger when the same is moved by the stem and disengage the same from said stem, substantially as set forth.

4. In a photographic shutter, the combination of a casing having an opening, slats to close the same, a slide connected to the slats, a finger pivoted on said slide, a stem normally engaging said finger, means for actuating the stem to move the slide in one direction, a spring to move the slide in the other direction, and a pivoted trip-lever having an inclined surface adapted when the trip-lever is swung into operative position, to be in position to be engaged by the finger when the same is moved by the stem to disengage said finger from the stem, substantially as set forth.

5. The combination with a frame, of a series of pivoted slats, a connection between the said slats by which they are axially moved, a spring-sustained finger pivotally attached to said connection, means for applying movement to the finger to operate the slats, and means for disengaging the finger with the movement-applying means, substantially described.

6. The combination with a frame, of a shutter proper, a pivoted finger connected to the shutter, means for moving the finger to actuate the shutter, and an inclined wing capable of disengaging the finger and said means, substantially as described.

7. The combination with a frame, of a series of pivoted slats, a connection between the slats by which they are axially moved, a finger pivoted on the connection, a spring tending to move the finger in one direction, an inclined wing pressed by the finger, and a stem movable in a fixed line to engage the finger, the inclined wing being capable of forcing the finger laterally against the tension of the spring, substantially as described.

8. The combination with a frame, of a series of pivoted slats, a connection between the slats for axially moving them, a finger carried by the connection, a stem movable to engage the finger, and means for moving the stem, substantially as described.

9. The combination with a frame, of a shutter proper, means for applying operative movement to the shutter, a spring tending to close the shutter, an operated stem coöperating with the means for applying movement to the shutter, and trip mechanism for instantaneously disengaging the stem and movement-applying means, substantially as described.

10. The combination with a frame, a series of pivoted slats, slotted plates carried by the slats, a slide having pins respectively engaged in the slots of the plates, a finger pivotally mounted on the slide, a spring engaging the finger to move it in one direction, an operated stem movable to engage and actuate the finger, a pivotally-mounted arm, and an inclined wing carried by the arm and capable of engaging the finger to move it against the tendency of the spring, substantially as described.

11. The combination with a frame, of a series of pivoted slats, a slide connected to axially move said slats, an arm fixed to the slide and projecting laterally therefrom, a finger pivotally mounted on the arm, a stem movable in a line parallel with the slide and capable of engaging the finger, means for moving the stem, and a spring capable of returning the slide, substantially as described.

In testimony whereof I have signed my name to this specification in the presence of two subscribing witnesses.

OSKAR FRIESE.

Witnesses:
  OTTO HERING,
  GUSTAV HÜLSMANN.